(12) United States Patent
Jain et al.

(10) Patent No.: US 12,170,616 B2
(45) Date of Patent: *Dec. 17, 2024

(54) TUNNEL-BASED SERVICE INSERTION IN PUBLIC CLOUD ENVIRONMENTS

(71) Applicant: VMware LLC, Palo Alto, CA (US)

(72) Inventors: Rahul Jain, Sunnyvale, CA (US); Kantesh Mundaragi, Bangalore (IN); Pierluigi Rolando, Santa Clara, CA (US); Jayant Jain, Cupertino, CA (US); Mukesh Hira, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,366

(22) Filed: Jan. 30, 2023

(65) Prior Publication Data

US 2023/0171193 A1 Jun. 1, 2023

Related U.S. Application Data

(63) Continuation of application No. 17/133,555, filed on Dec. 23, 2020, now Pat. No. 11,570,104, which is a (Continued)

(51) Int. Cl.
*H04L 45/745* (2022.01)
*G06F 9/455* (2018.01)
(Continued)

(52) U.S. Cl.
CPC ........ *H04L 45/745* (2013.01); *G06F 9/45558* (2013.01); *H04L 12/4633* (2013.01);
(Continued)

(58) Field of Classification Search
CPC .............. H04L 45/745; H04L 12/4633; H04L 12/4641; H04L 49/354; H04L 49/70;
(Continued)

(56) References Cited

U.S. PATENT DOCUMENTS 10,892,989 B2 1/2021 Jain et al.
11,570,104 B2 1/2023 Jain et al.
(Continued)

FOREIGN PATENT DOCUMENTS

CN 103217935 A 7/2013
CN 103369027 A 10/2013
(Continued)

*Primary Examiner* — Mang Hang Yeung
(74) *Attorney, Agent, or Firm* — Quarles & Brady LLP (57) ABSTRACT

Example methods and systems are provided a network device to perform tunnel-based service insertion in a public cloud environment. An example method may comprise establishing a tunnel between the network device and a service path. The method may also comprise: in response to receiving a first encapsulated packet, identifying the service path specified by a service insertion rule; generating and sending a second encapsulated packet over the tunnel to cause the service path to process an inner packet according to one or more services. The method may further comprise: in response to receiving, from the service path via the tunnel, a third encapsulated packet that includes the inner packet processed by the service path, sending the inner packet processed by the service path, or a fourth encapsulated packet, towards a destination address of the inner packet.

20 Claims, 8 Drawing Sheets

Related U.S. Application Data continuation of application No. 16/251,080, filed on Jan. 18, 2019, now Pat. No. 10,892,989.

(51) Int. Cl.
  *H04L 12/46* (2006.01)
  *H04L 49/00* (2022.01)
  *H04L 49/354* (2022.01)

(52) U.S. Cl.
  CPC ........ *H04L 12/4641* (2013.01); *H04L 49/354* (2013.01); *H04L 49/70* (2013.01); *H04L 2212/00* (2013.01)

(58) Field of Classification Search
  CPC ............. H04L 2212/00; H04L 41/5041; G06F 9/45558; G06F 2009/45595
  USPC ........................................................ 370/392

See application file for complete search history.

(56) References Cited

U.S. PATENT DOCUMENTS

| | | | |
|---|---|---|---|
| 2013/0124465 | A1 | 5/2013 | Pingel et al. |
| 2013/0163594 | A1* | 6/2013 | Sharma .................. H04L 45/66 370/392 |
| 2013/0212214 | A1* | 8/2013 | Lawson .................. H04L 67/12 709/217 |
| 2013/0268588 | A1 | 10/2013 | Chang et al. |
| 2016/0087940 | A1 | 3/2016 | Miller et al. |
| 2016/0352538 | A1* | 12/2016 | Chiu ..................... H04L 45/306 |
| 2018/0063193 | A1* | 3/2018 | Chandrashekhar .......................... G06F 11/2035 |
| 2018/0069924 | A1 | 3/2018 | Tumuluru et al. |
| 2018/0139073 | A1 | 5/2018 | Han et al. |
| 2018/0198854 | A1 | 7/2018 | Rong et al. |
| 2021/0194807 | A1 | 6/2021 | Jain et al. |

FOREIGN PATENT DOCUMENTS

| | | | |
|---|---|---|---|
| CN | 105591873 | A | 5/2016 |
| CN | 107077367 | A | 8/2017 |
| CN | 107948086 | A | 4/2018 |
| WO | 2016065097 | A1 | 4/2016 |
| WO | 2020150527 | A1 | 7/2020 |

* cited by examiner

TUNNEL-BASED SERVICE INSERTION IN PUBLIC CLOUD ENVIRONMENTS

CLAIM OF BENEFIT TO PRIOR APPLICATIONS

This application is a continuation application of U.S. patent application Ser. No. 17/133,555, filed Dec. 23, 2020, now published as 2021/0194807. U.S. patent application Ser. No. 17/133,555 is a continuation application of U.S. patent application Ser. No. 16/251,080, filed Jan. 18, 2019, now issued as U.S. Pat. No. 10,892,989. U.S. patent application Ser. No. 17/133,555, now published as 2021/0194807, and U.S. patent application Ser. No. 16/251,080, now issued as U.S. Pat. No. 10,892,989, are incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined data center (SDDC). For example, through server virtualization, virtualization computing instances such as virtual machines (VMs) running different operating systems may be supported by the same physical machine (e.g., also referred to as a "host"). Each VM is generally provisioned with virtual resources to run a guest operating system and applications. The virtual resources may include central processing unit (CPU) resources, memory resources, storage resources, network resources, etc.

In practice, a user (e.g., organization) may run various applications using "on-premise" data center infrastructure in a private cloud environment that is under the user's ownership and control. Alternatively or additionally, the user may run applications "in the cloud" using infrastructure that is under the ownership and control of a public cloud provider. In the latter case, it may be challenging to configure and provide various services (e.g., firewall) for applications that are running in a public cloud environment.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to configuring and providing services in public cloud environments will now be explained in more detail using FIG. 1, which is a schematic diagram illustrating example public cloud environment 100 in which tunnel-based service insertion may be performed. It should be understood that, depending on the desired implementation, public cloud environment 100 may include additional and/or alternative components than that shown in FIG. 1.

Figure 1:
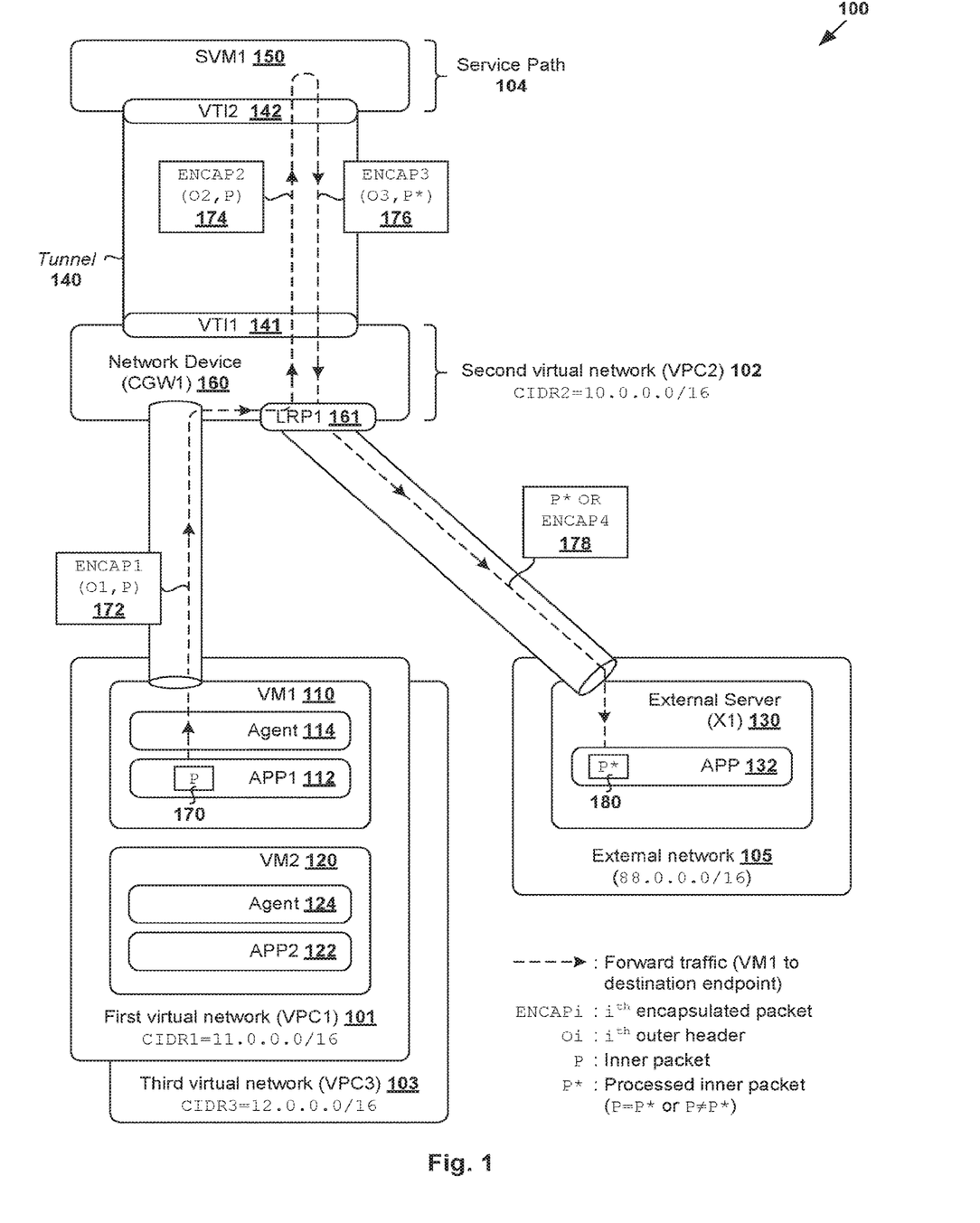
FIG. 1 is a schematic diagram illustrating an example public cloud environment in which tunnel-based service insertion may be performed.

In the example in FIG. 1, public cloud environment 100 includes multiple virtual networks 101-103 that are logically isolated from each other. For example, endpoints in the form of virtual machines (VMs) VM1 110 and VM2 120 may be deployed in first virtual network 101 to run respective applications labelled "APP1" 112 and "APP2" 122 "in the cloud" using another entity's (i.e., cloud provider) infrastructure. In practice, a cloud provider is generally an entity that offers a cloud-based platform to multiple users or tenants. This way, the tenants may take advantage of the scalability and flexibility provided by public cloud environment 100 to extend the physical capability of their respective on-premise data centers.

Throughout the present disclosure, the term "virtual network" in a public cloud environment may refer generally to a software-implemented network that is logically isolated from at least one other virtual network in the public cloud environment. For example, virtual networks 101-103 may be Amazon Virtual Private Clouds (VPCs) provided by Amazon Web Services® (AWS). Amazon VPC and Amazon AWS are registered trademarks of Amazon Technologies, Inc. Using the AWS example in FIG. 1, virtual networks 101-103 are also labelled "VPC1" 101, "VPC2" 102 and "VPC3" 103, respectively. In practice, other types of virtual network may be used, such as Azure Virtual Networks (VNets) from Microsoft Azure®; VPCs from Google Cloud Platform™; VPCs from IBM Cloud™; a combination thereof, etc. Each virtual network 101/102/103 in public cloud environment 100 may be configured with a classless inter-domain routing (CIDR) block, such as first CIDR block=11.0.0.0/16 for VPC1 101, second CIDR block=10.0.0.0/16 for VPC2 102, third CIDR block=12.0.0.0/16 for VPC3 103, etc. In practice, each CIDR block may be further divided into subnets.

Figure 2:
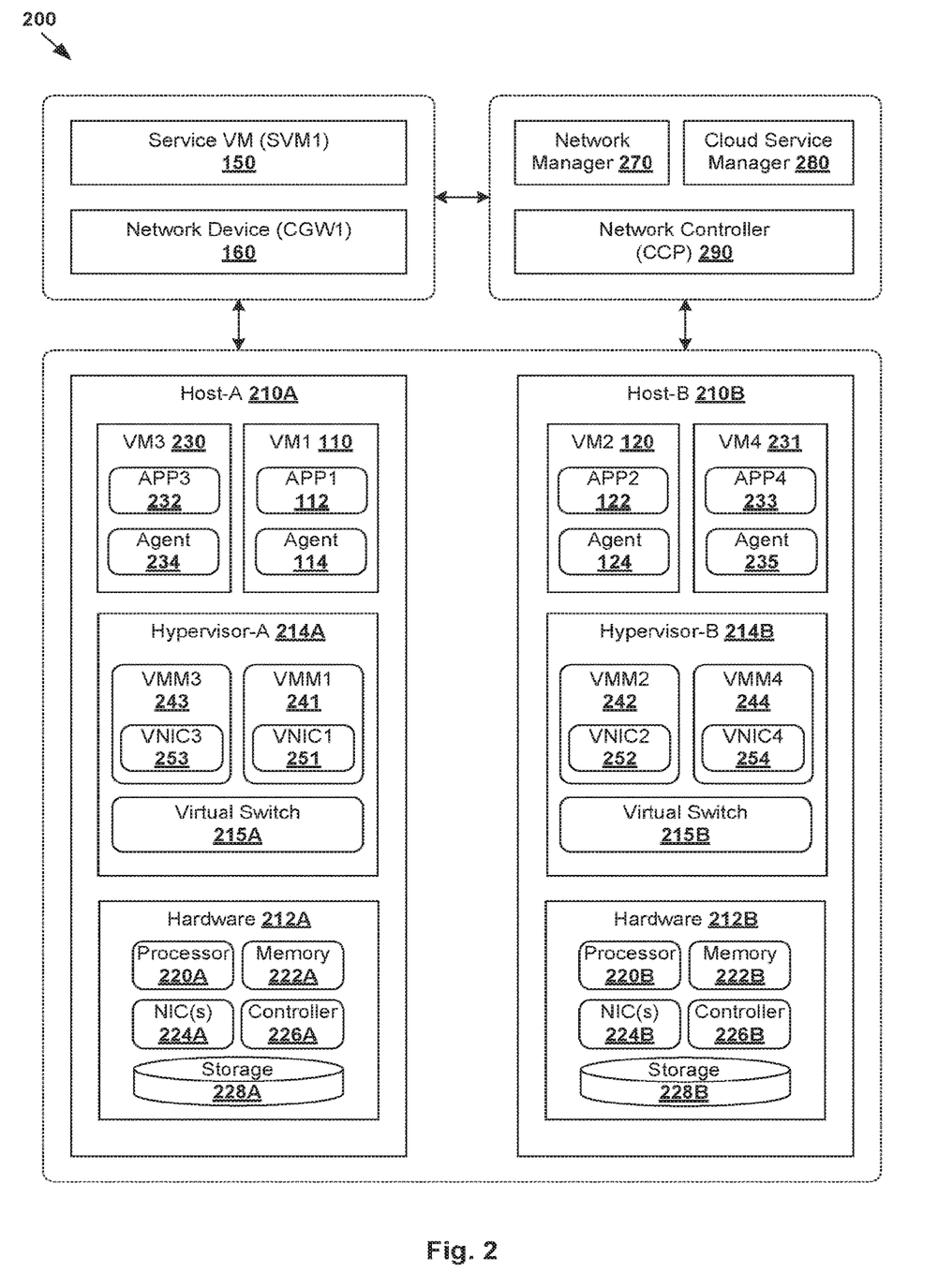
FIG. 2 is a schematic diagram illustrating a physical implementation view of the public cloud environment in FIG. 1.

VMs 110-120 will be explained in more detail using FIG. 2, which is a schematic diagram illustrating physical implementation view 200 of example public cloud environment 100 in FIG. 1. Depending on the desired implementation, physical implementation view 200 may include additional and/or alternative component(s) than that shown in FIG. 2. In the example in FIG. 2, VMs 110-120, 230-231 may be supported by hosts 210A-B (also known as "end hosts," "computing devices", "host computers", "host devices", "physical servers", "server systems", "physical machines," "transport nodes," etc.). For example, VM3 230 and VM4 231 may be deployed in third virtual network 103 to run respective applications "APP3" 232 and "APP4" 233 in the cloud.

Hosts 210A-B may each include virtualization software (e.g., hypervisor 214A/214B) that maintains a mapping between underlying hardware 212A/212B and virtual resources allocated to VMs 110-120, 230-231. Hosts 210A-B may be interconnected via a physical network formed by various intermediate network devices, such as physical network devices (e.g., physical switches, physical routers, etc.) and/or logical network devices (e.g., logical switches, logical routers, etc.). Hardware 212A/212B includes suitable physical components, such as processor(s) 220A/220B; memory 222A/222B; physical network interface controller(s) or NIC(s) 224A/224B; and storage disk(s) 228A/228B accessible via storage controller(s) 226A/226B, etc.

Virtual resources are allocated to each VM to support a guest operating system (OS) and applications (see 112/122/232/233). Agent 114/124/234/235 may be configured on each VM 110/120/230/231 to perform any suitable processing to support packet handling (e.g., encapsulation and decapsulation), etc. Corresponding to hardware 212A/212B, the virtual resources may include virtual CPU, virtual memory, virtual disk, virtual network interface controller (VNIC), etc. Hardware resources may be emulated using virtual machine monitors (VMMs) 241-244, which may be considered as part of (or alternatively separated from) corresponding VMs 110-120, 230-231. For example in FIG. 2, VNICs 251-254 are virtual network adapters for the respective VMs, and are emulated by corresponding VMMs 241-244 instantiated by their respective hypervisors 214A-B.

Although examples of the present disclosure refer to VMs, it should be understood that a "virtual machine" running on a host is merely one example of a "virtualized computing instance." or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 214A/214B further implements virtual switch 215A/215B to handle egress packets from, and ingress packets to, corresponding VMs 110-120, 230-231. The term "packet" may refer generally to a group of bits that can be transported together from a source to a destination, such as message, segment, datagram, etc. The term "traffic" may refer generally to a flow of packets. The term "layer 2" may refer generally to a media access control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models. The term "endpoint" may refer generally an originating node ("source endpoint") or terminating node ("destination endpoint") of a bi-directional inter-process communication flow.

Network manager 270, cloud service manager 280 and network controller 290 are example network management entities that facilitate management of various entities deployed in public cloud environment 100. An example network controller is the NSX controller component of VMware NSX® (available from VMware, Inc.) that resides on a central control plane. Network manager 270 (e.g., NSX manager) and cloud service manager 280 may be entities that reside on a management plane. Cloud service manager 280 may provide an interface for end users to configure their public cloud inventory (e.g., VMs 110-120, 230-231) in public cloud environment 100. Management entity 270/280/290 may be implemented using physical machine(s), virtual machine(s), a combination thereof, etc.

Referring to FIG. 1 again, service path 104 may be "inserted" between a source endpoint (e.g., 110) and a destination endpoint (e.g., 130) to provide various service(s) in public cloud environment 100. In particular, service path 104 may include at least one (i.e., N≥1) service virtualized computing instance (also known as "service endpoint," "service VM" (SVM) or "virtual network function" (VNF)). For example, SVM1 150 may be "inserted" along a datapath between VM1 110 and an external server labelled "X1" 130 to provide a firewall service for security purposes. This way, a packet flow between source VM1 110 and X1 130 may be steered or forwarded via SVM1 150, which decides whether to allow or drop packets according to any suitable firewall rules. Although one service VM is shown in FIG. 1 for simplicity, it should be understood that service path 104 may include multiple SVMs (forming a service chain), such as SVM1 150 providing the firewall service and another SVM providing a network address translation (NAT) service, etc. In practice, a service chain may represent an instantiation of an ordered set of service functions.

Conventionally, there are various challenges associated with service insertion in public cloud environment 100. For example, in contrast with on-premise infrastructure, a user generally does not have any direct control over underlying hypervisors and hardware that support VMs 110-120, 230-231. One conventional approach is to deploy SVM1 150 in the same VPC as source endpoint VM1 110, and modifying a default route in an underlay route table to forward packets to SVM1 150. However, this imposes a limitation on the deployment of SVM1 150, which some users may find undesirable for performance and scalability reasons.

Tunnel-Based Service Insertion

According to examples of the present disclosure, service insertion may be performed in an improved manner to steer packets according to service insertion rules. In the example in FIG. 1, an example network device 160 in the form of a cloud gateway (see "CGW1") is deployed in public cloud environment 100. To facilitate service insertion, tunnel 140 may be established between CGW1 160 and SVM1 150 located on service path 104. This way, according to the service insertion rules, packets may be redirected to SVM1 150 for packet processing via tunnel 140.

Using examples of the present disclosure, service insertion may be implemented in a more flexible and scalable manner. For example, there is no limitation as to where service path 104 is deployed. In practice, SVM1 150 may be deployed in the same virtual network 102 as CGW1 160 or a different virtual network (e.g., VPC1 101 or VPC3 103) in public cloud environment 100. Alternatively, SVM1 150 may be deployed in a private cloud environment, such as within a user's on-premise data center. Further, using a hub-spoke topology (to be discussed using FIG. 8), CGW1 160 may act as a gateway to steer packets to various service paths. Using examples of the present disclosure, service insertion may be implemented in an agnostic manner that does not depend on the specific implementation details of the underlying infrastructure of public cloud environment 100.

As used herein, a "network device" may be implemented using one or more virtual machines (VMs) and/or physical machines (also known as "bare metal machines") in public cloud environment 100 and capable of performing functionalities of a gateway, switch, router, bridge, any combination thereof, etc. As used herein, the term "service path" may refer generally to a path between a source and a destination through which packets are steered to provide service(s) to the packets. A service path may include at least one "service virtualized computing instance" (also known as "infrastructure virtualized computing instance") that is configured to provide a "service." The term "service" may be any suitable networking or non-networking service, such as firewall, load balancing, NAT, intrusion detection, deep packet inspection (DPI), traffic shaping, traffic optimization, packet header enrichment or modification, packet tagging, content filtering, etc. It should be understood that the packet processing operation(s) associated with a service may or may not modify the content (i.e., header and/or payload) of the packets. Depending on the desired implementation, service path 104 may also include third-party service VM(s) configured to provide, for example, enhanced security services, etc.

Figure 3:
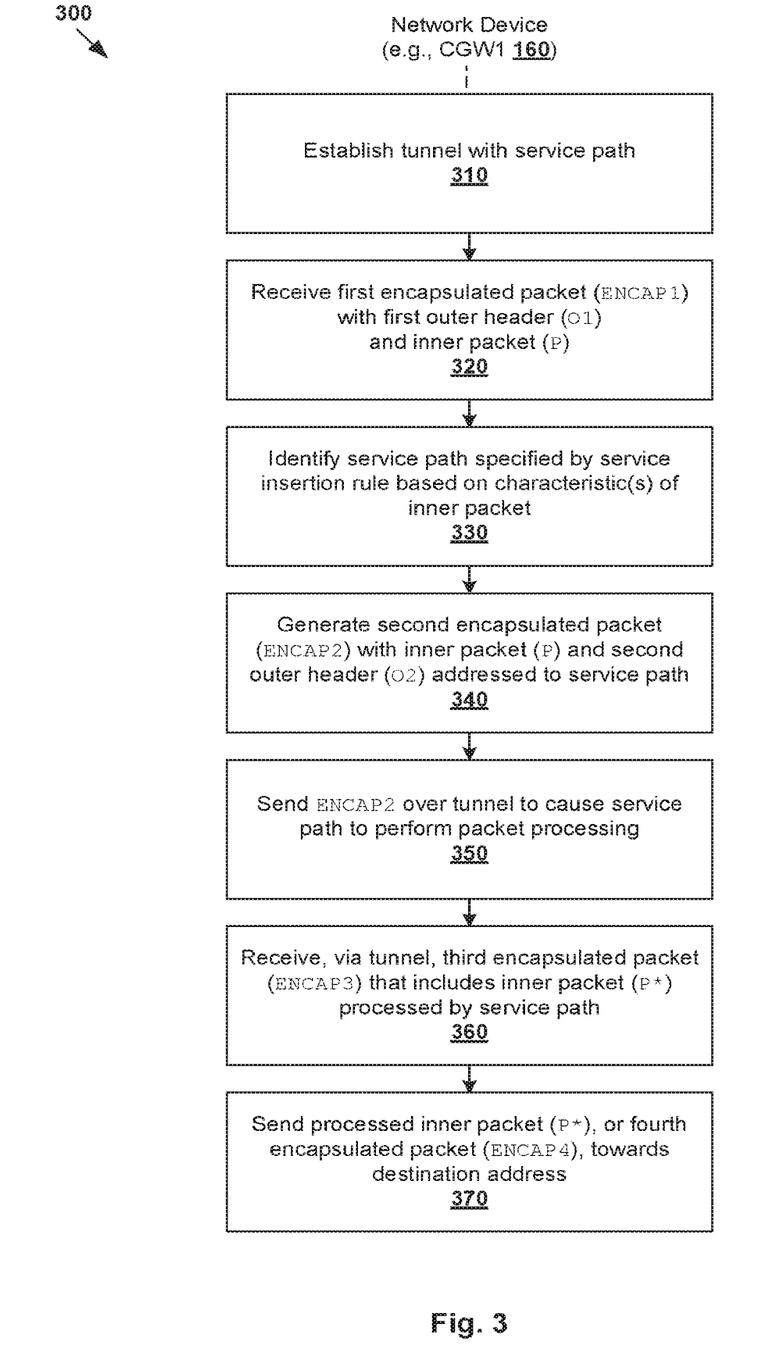
FIG. 3 is a flowchart of an example process for a network device to perform tunnel-based service insertion in a public cloud environment.

In more detail, FIG. 3 is a flowchart of example process 300 for network device 160 to perform tunnel-based service insertion in public cloud environment 100. Example process 300 may include one or more operations, functions, or actions illustrated by one or more blocks, such as 310 to 370. The various blocks may be combined into fewer blocks, divided into additional blocks, and/or eliminated depending on the desired implementation. In the following, examples will be discussed using VM1 110 as an example "source endpoint" or "virtualized computing instance," X1 130 as example "destination endpoint," CGW1 160 as example "network device," and SVM1 150 as example "service virtualized computing instance." Although the terms "first" and "second" are used to describe various elements, these elements should not be limited by these terms. These terms are used to distinguish one element from another. For example, a first element may be referred to as a second element, and vice versa.

At 310 in FIG. 3, tunnel 140 is established between CGW1 160 and service path 104. Here, the term "tunnel" may generally refer to an end-to-end, bi-directional communication path between a pair of interfaces, such as virtual tunnel interfaces (VTIs) labelled VTI1 141 and VTI2 142 in FIG. 1. Any suitable tunneling protocol may be used, such as Internet Protocol Security (IPSec), etc. Once tunnel 140 is established, CGW1 160 and SVM1 150 may exchange route information using route advertisements (to be discussed using FIGS. 4-5) to facilitate service insertion.

At 320 in FIG. 3, CGW1 160 receives a first encapsulated packet (see ENCAP1 172 in FIG. 1) from VM1 110. In the example in FIG. 1, first encapsulated packet 172 includes an inner packet (see "P" 170 in FIG. 1) and a first outer header (see O1) that is addressed from VM1 110 (e.g., IP address=IP-VM1) located in first virtual network 101 to destination CGW1 160 (e.g., IP address=IP-CGW) located in second virtual network 102.

At 330 in FIG. 3, in response to receiving first encapsulated packet 172, CGW1 160 identifies service path 104 specified by a service insertion rule based on one or more characteristics of the inner packet. Here, the term "service insertion rule" or "service insertion policy" may refer generally to a rule (e.g., table entry) specifying a service path associated with at least one characteristic of a packet such that the packet may be forwarded to the service path for processing. The service insertion rule may be configured to be applicable at a logical interface (e.g., LRP1 161) of CGW1 160 to facilitate service insertion for north-south traffic.

In practice, block 330 may involve matching the service insertion rule to the following: a source address (e.g., IP-VM1) of the inner packet, a destination address (e.g., IP-X1), a logical interface (e.g., LRP1 161) via which the destination address is reachable, any combination thereof, etc. Other characteristics of the inner packet upon which a service path decision may be based may include other header values such as a source address, port number, or metadata associated with the packet maintained, compiled, or retrieved by the network device.

At 340 and 350 in FIG. 3, CGW1 160 generates and sends a second encapsulated packet (see ENCAP2 174 in FIG. 1) over tunnel 140. In the example in FIG. 1, second encapsulated packet 174 includes the inner packet (see P) and a second outer header (see O2) that is addressed from CGW1 160 (e.g., source IP-CGW) to SVM1 150 (e.g., destination IP-Y, which is a routable IP address of SVM1 150). Second encapsulated packet 174 is sent over tunnel 140 to cause service path 104 to process the inner packet according any suitable service(s).

At 360 and 370 in FIG. 3, in response to CGW1 160 receiving a third encapsulated packet (see ENCAP3 176 in FIG. 1) that includes a third outer header (see O3) and the inner packet (see P* at 176) processed by service path 104, CGW1 160 sends the processed inner packet (see P* at 178) towards the destination address. Alternatively, block 370 may involve generating and sending a fourth encapsulated packet (see ENCAP4 178 in FIG. 1) that includes the processed inner packet (P*) towards the destination address. See also 180 in FIG. 1.

Depending on the desired implementation, service path 104 may perform packet modification, in which case processed inner packet (see P* at 176) will be different from the inner packet (see P at 174). Alternatively, in the case of no packet modification, the processed inner packet will be the same as the inner packet. For example, SVM1 150 implementing a firewall service usually does not modify the header and payload of the inner packet. In contrast, SVM1 150 implementing a NAT service will modify address information in the inner packet, such as by translating a private IP address to a public IP address, etc. In the following, various examples will be discussed using FIG. 4 to FIG. 8. Although explained using north-south traffic, it should be understood that examples of the present disclosure may be implemented to provide tunnel-based service insertion for east-west traffic (e.g., between VM1 110 in VPC1 101 and VM3 230 in VPC3 103).

Configuration

Figure 4:
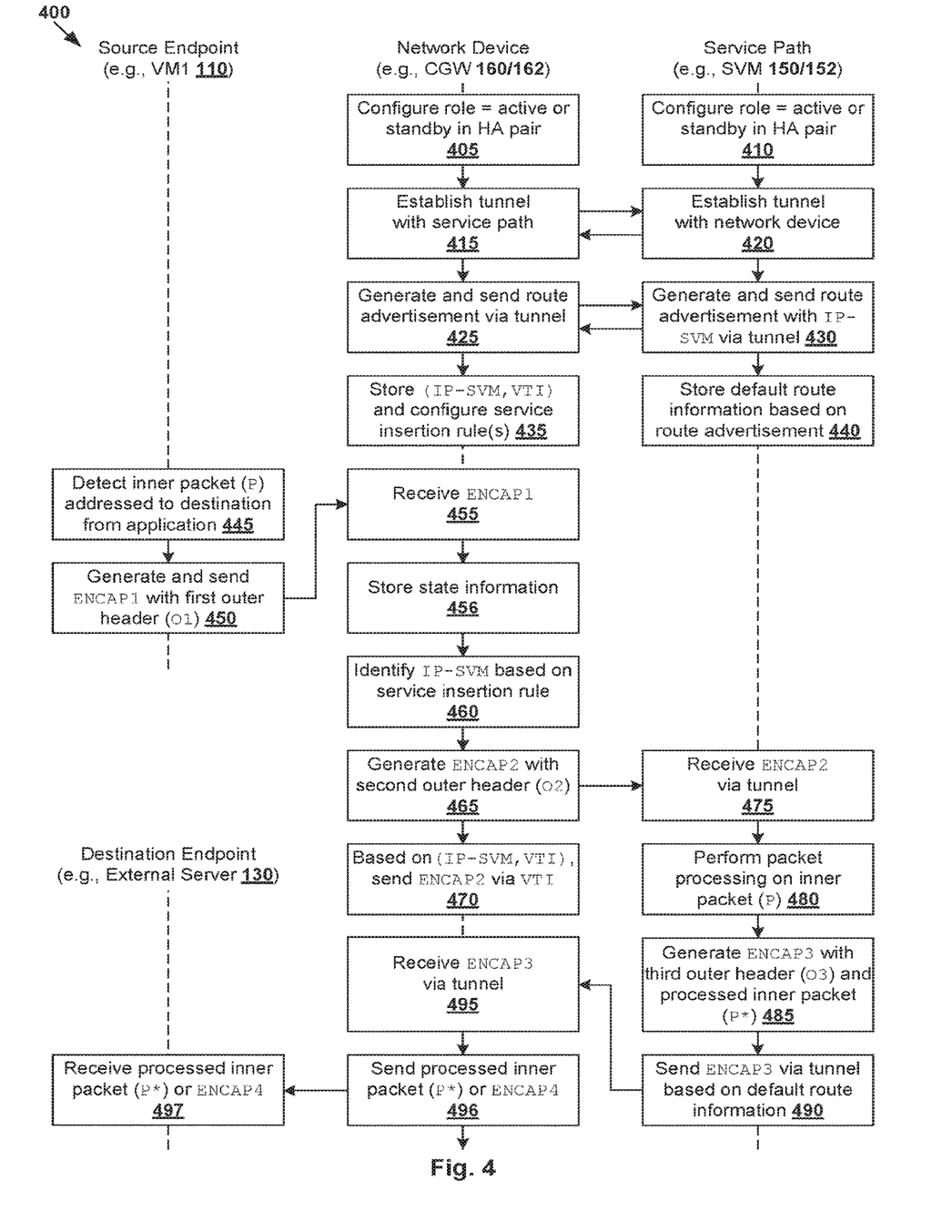
FIG. 4 is a flowchart of an example detailed process for tunnel-based service insertion in a public cloud environment.

FIG. 4 is a flowchart of example detailed process 400 for tunnel-based service insertion in public cloud environment 100. Example process 400 may include one or more operations, functions, or actions illustrated at 405 to 498. The various operations, functions or actions may be combined into fewer blocks, divided into additional blocks, and/or eliminated depending on the desired implementation. The example in FIG. 4 will be explained using FIG. 5, which is a schematic diagram illustrating example configuration 500 for tunnel-based service insertion according to the example in FIG. 4.

Figure 5:
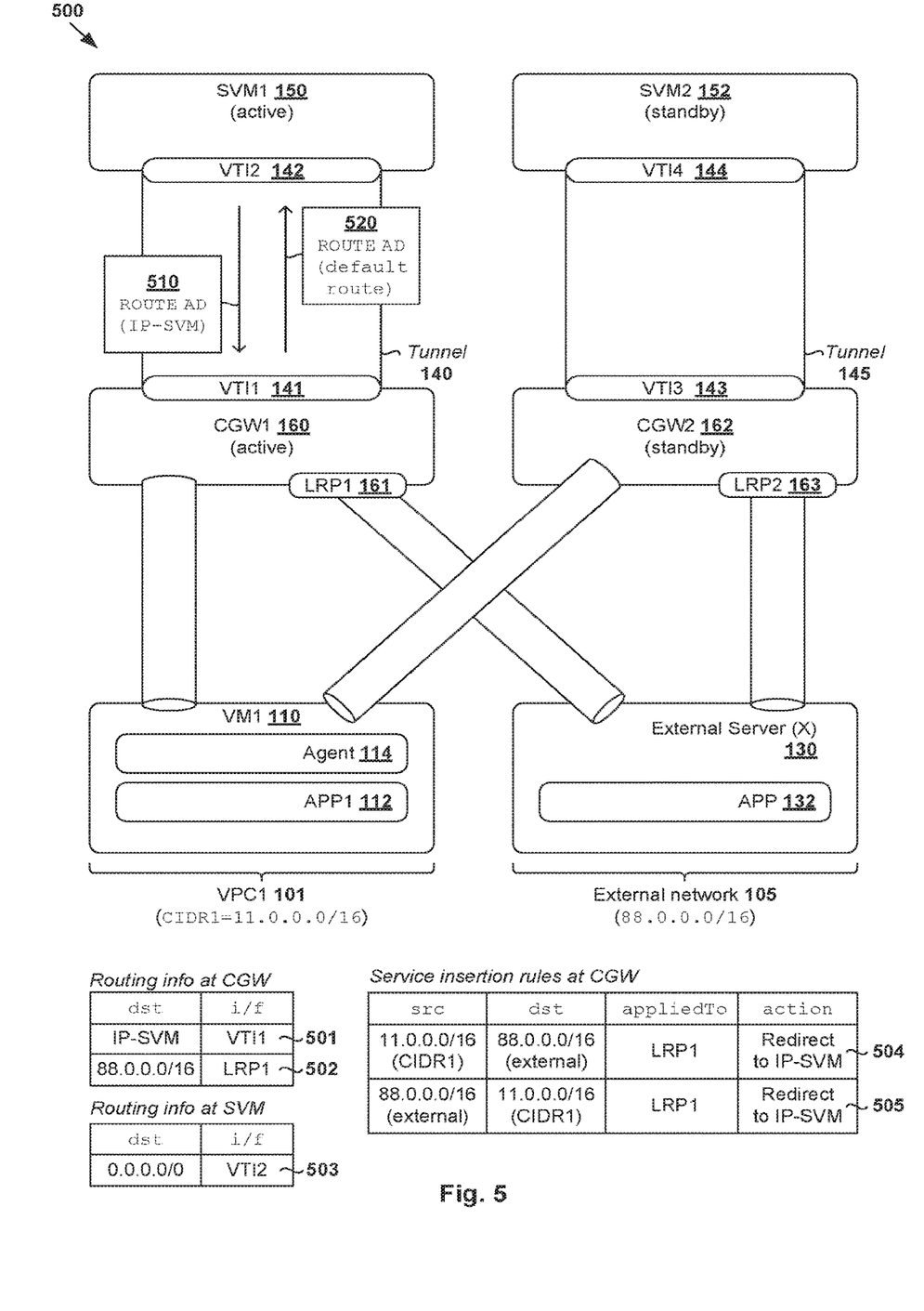
FIG. 5 is a schematic diagram illustrating an example configuration for tunnel-based service insertion according to the example in FIG. 4.

The examples in FIG. 4 and FIG. 5 may be implemented by SVMs 150-152, CGWs 160-162, source endpoint=VM1 110 (e.g., using agent 114) and destination endpoint=X1 130. It should be understood that service insertion may also be implemented for any additional and/or alternative VMs, such as VM2 120, VM3 230 and VM4 231 (see FIG. 2). Using AWS as an example public cloud deployment, first virtual network 101 in which VMs 110-120 are deployed may represent a first VPC ("VPC1") associated with a first CIDR block ("CIDR1")=11.0.0.0/16. Second virtual network 102 may represent a second VPC ("VPC2") associated with a second CIDR block ("CIDR2")=10.0.0.0/16, and therefore logically isolated from first virtual network 101. Third virtual network 103 in FIG. 1 is not shown in FIG. 5 for simplicity.

(a) High Availability (HA) Pairs

At 405 in FIG. 4, CGW1 160 and CGW2 162 are deployed in VPC2 102 to facilitate service insertion for various VMs, such as VM1 110, etc. In practice, CGW 160/162 may be a cloud gateway appliance (CGW) deployed in public cloud environment 100. In the example in FIG. 5, CGW1 160 and CGW2 162 are configured as a high availability (HA) pair. CGW1 160 is assigned with role=primary (i.e., active), and CGW2 162 with role=secondary (i.e., standby) for fault tolerance purposes. Using the active-standby configuration, CGW1 160 usually operates as the active gateway, and CGW2 162 as the standby gateway. In case of a failure at the active gateway, the standby gateway initiates a switchover or failover process to take over as the active gateway to handle service insertion. CGW1 160 and CGW2 162 each connect VPC1 101 (i.e., 11.0.0.0/16) to external network 105 (i.e., 88.0.0.0/16) via respective uplink logical interfaces labelled LRP1 161 and LRP2 163.

At 410 in FIG. 4, SVM1 150 and SVM2 152 are deployed to provide any suitable service(s). Depending on the desired implementation, SVM1 150 and SVM2 152 may be deployed in the same VPC as CGW 160/162 (e.g., VPC1 101), a different VPC (e.g., VPC2 102 or VPC3 103), in a private cloud environment (e.g., on-premise data center), etc. SVM1 150 and SVM2 152 may be configured as a HA pair. For example, SVM1 150 is assigned with role=primary (i.e., active), and SVM2 152 with role=secondary (i.e., standby). Using the active-standby configuration, SVM1 150 usually operates as the active SVM, and SVM2 152 as the standby SVM. In case of a failure at the active SVM, the standby SVM may take over as the active SVM.

Using the active-standby configuration, any of the following combinations may be active at a particular instance: (PGC1 160, SVM1 150), (PGC1 160, SVM2 152), (PGC2 162, SVM1 150) and (PGC2 162, SVM2 152). To implement the active-standby configuration, each member of the HA pair is configured to detect the aliveness or failure of its peer. For example, a fault detection session may be established between members of the HA pair using any suitable fault detection or continuity check protocol, such as Border Gateway Protocol (BGP), etc.

For example, using a monitoring session, CGW1 160 and CGW2 162 may monitor each other's status (i.e., alive or not) through control messages. Similarly, another monitoring session may be established between SVM1 150 and SVM2 152. Additionally or alternatively, members of each HA pair may also detect the aliveness by exchanging heartbeat messages. It should be understood that examples of the present disclosure may be implemented for active-active configuration, in which case all members of a HA pair are active at the same time.

(b) Tunnel Establishment

At 415 and 420 in FIG. 4, tunnel 140 may be established between CGW1 160 and SVM1 150 to implement, for example, a route-based virtual private network (VPN). In the example in FIG. 5, first tunnel 140 may be established between VTI1 141 associated with CGW1 160, and VTI2 142 associated with SVM1 150. Second tunnel 145 may be established between a second pair of virtual tunnel endpoints, i.e., VTI3 143 of CGW2 162, and VTI4 144 of SVM2 152. Although not shown in FIG. 5 for simplicity, additional tunnels may be established between CGW1 160 and SVM2 152, and CGW2 162 and SVM1 150 respectively.

Any suitable tunneling protocol may be used, such as IPSec to facilitate secure communication over tunnel 140/142. In practice, IPsec describes a framework for providing security services at the network (IP) layer, as well as the suite of protocols for authentication and encryption. Two example protocols are Encapsulating Security Payload (ESP) and Authentication Header (AH). For example, ESP may be used to provide data-origin authentication, connectionless data integrity through hash functions, and confidentiality through encryption protection for IP packets. AH may be used to provide connectionless data integrity and data origin authentication for IP datagrams.

(c) Route Information Exchange

At 425 and 430 in FIG. 4, CGW1 160 and SVM1 150 may exchange route information using route advertisements (see 510-520 in FIG. 5) via tunnel 140. In the example in FIG. 5, SVM1 150 may generate and send a first route advertisement (see 510) via tunnel 140 to advertise a virtual service endpoint IP address (e.g., IP-SVM) to CGW1 160. In response to receiving first route advertisement 510 via interface VTI1 141, CGW1 160 learns or stores route information in the form of (destination=IP-SVM, interface=VTI1). See corresponding 435 in FIGS. 4 and 501 in FIG. 5.

Similarly, CGW1 160 may generate and send a second route advertisement (see 520) via tunnel 140 to advertise default route information to SVM1 150. In practice, a "default route" takes effect when no other route is available for an IP destination address according to a longest prefix match approach. For example, the default route is designated as 0.0.0.0/0 in IP version 4 (IPv4), and ::/0 in IP version 6 (IPv6). In response to receiving second route advertisement 520 via interface VT21 142, SVM1 150 updates its route information to store default route (destination=0.0.0.0/0, interface=VT21). This way, SVM1 150 may be configured to send packets to CGW1 160 after performing packet processing. See 440 in FIGS. 4 and 503 in FIG. 5.

Any suitable inter-domain routing protocol (also known as gateway protocol) may be used for route advertisements 510-520, such as such as BGP, Open Shortest Path First (OSPF), Intermediate System to Intermediate System (IS-IS), etc. For example, BGP is an exterior gateway protocol that is used to exchange route information among routers in different autonomous systems. In case of a failover, SVM2 152 may take over the active role and advertise the same virtual service endpoint IP address (e.g., IP-SVM) through a separate tunnel (not shown in FIG. 5) between SVM2 152 and CGW1 160. Note that CGW1 160 may also learn route information in the form of (destination=88.0.0.0/16, interface=LRP1) to reach external server 130 via uplink logical interface (i.e., LRP1 161). See 502 in FIG. 5.

(d) Service Insertion Rules

At 435 in FIG. 4, service insertion rules may be configured at CGW1 160 based on route advertisement 520. In the example in FIG. 5, service insertion rules 504-505 represent a set of policy-based rules (called routes or route table entries) that are used to specify a steering action for traffic between VPC1 101 (i.e., CIDR1=11.0.0.0/16) and external network 105 (i.e., 88.0.0.0/16). Both rules 504-505 specify a redirection or steering action to the virtual service endpoint IP address (i.e., IP-SVM) advertised by SVM1 150 via tunnel 140.

For egress traffic, first service insertion rule 504 specifies (source=11.0.0.0/16, destination=88.0.0.0/16, appliedTo=LRP1, action=redirect to IP-SVM) to facilitate service insertion for packets from VM1 110 to external network 105. For ingress traffic, second insertion rule 505 specifies (source=88.0.0.0/16, destination=11.0.0.0/16, appliedTo=LRP1, action=redirect to IP-SVM) to facilitate service insertion for ingress traffic from external network 105. Service insertion rules 504-505 may specify any alternative and/or additional packet characteristic(s), such as source port number, destination port number, source MAC address, destination MAC address, protocol information, logical network information (e.g., Virtual eXtensible Local Area Network (VXLAN) (or "virtual" network identifier (VNI)), tag information, meta data, any combination thereof, etc.

In practice, "LRP1" in service insertion rules 504-505 may represent an identifier of a logical interface labelled LRP1 161 via which external network 105 is reachable. Depending on the desired implementation, CGW1 160 may be represented using an upper-tier ("tier-0") logical router, in which case LRP1 161 is a logical router port of that logical router. Each VPC 101/102/103 may be represented using a lower-tier ("tier-1") logical router, such as "tier-1A" router for VPC1 101, "tier-1 B" router for VPC2 102, "tier-1C" router for VPC3 103, etc. Using VPC1 101 as an example, its associated "tier-1A" router may have a downlink to a logical switch to which VMs (e.g., VM1 110) connect. A link connecting VPC1 101 and CGW1 160 is called an uplink/router link. For north-south traffic, service insertion rules 504-505 may be applied on LRP1 160. For east-west traffic (e.g., from VPC1 101 to VPC3 103), service insertion rules (not shown) may be applied on an interface that connects CGW1 160 with VPC3 103.

Service Insertion for Egress Traffic

Using a policy-based routing approach, egress traffic may be redirected to SVM1 150 according to service insertion rule 504 configured at block 435. In the following, blocks 445-498 in FIG. 4 will be explained using FIG. 6, which is a schematic diagram illustrating first example 600 of tunnel-based service insertion for egress traffic in public cloud environment 100 according to the example in FIG. 4. It should be understood that examples of the present disclosure may be implemented for any suitable pair of source and destination endpoints.

(a) Steering Towards Service Path

At 445 and 450 in FIG. 4, in response to detecting an egress packet with data originating from application (APP1) 112 and destined for external server X1 130, VM1 110 generates and sends an encapsulated packet to the active CGW. In the example in FIG. 6, egress packet 610 (labelled P1) includes an inner header that is addressed from source address=IP-VM1 associated with VM1 110 to destination address=IP-X1 associated with X1 130.

Figure 6:
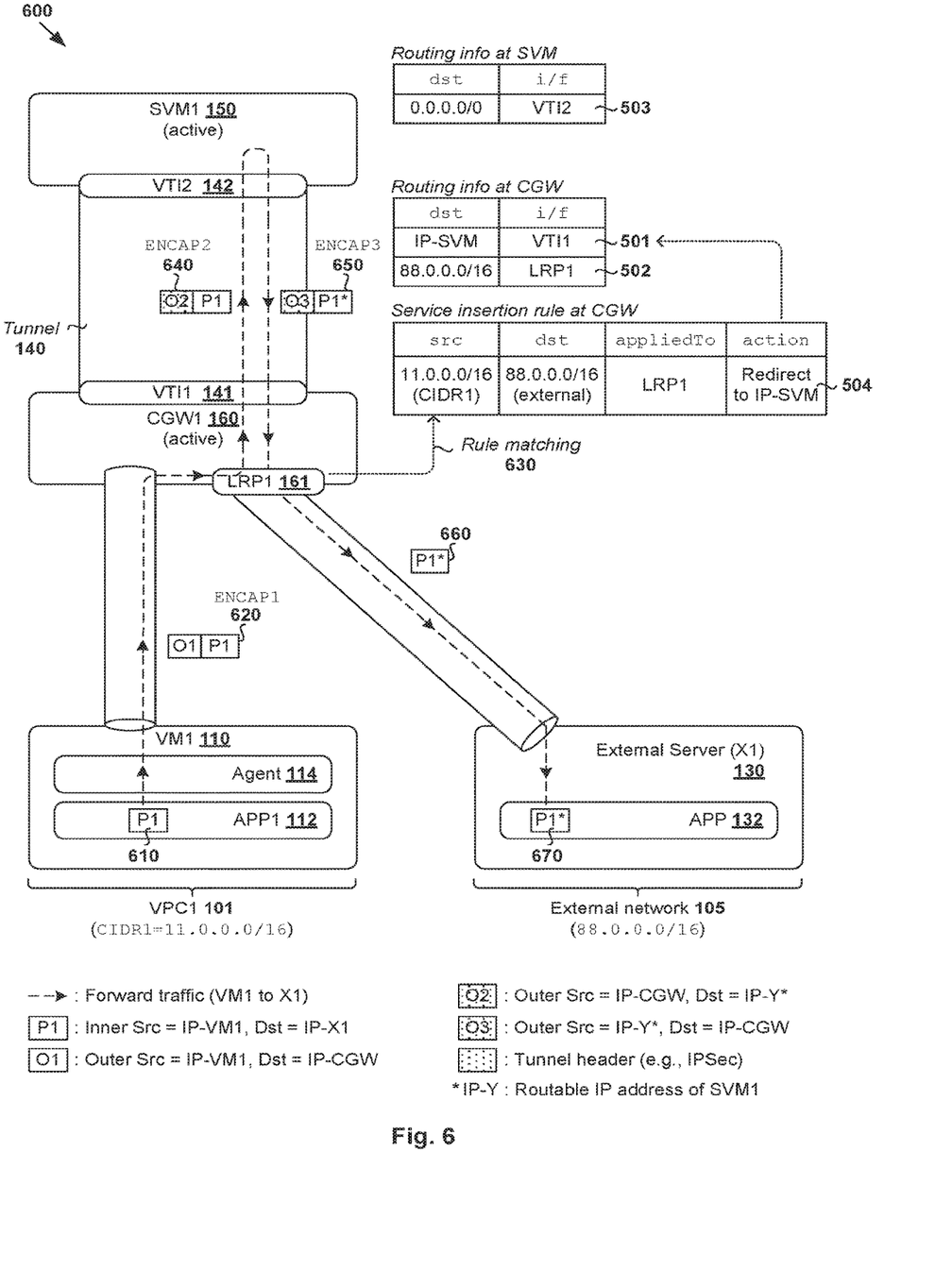
FIG. 6 is a schematic diagram illustrating a first example of tunnel-based service insertion for egress north-south traffic in a public cloud environment according to the example in FIG. 4.

In response to detecting inner packet P1 610, agent 114 of VM1 110 may generate first encapsulated packet 620 by encapsulating inner packet P1 610 with an outer header (labelled "O1"). The outer header is addressed from IP-VM1 to IP-CGW associated with the active CGW, say CGW1 160. Any suitable tunneling protocol may be used between CGW 160/162 and VM1 110, such as Generic Network Virtualization Encapsulation (GENEVE), etc.

At 455 in FIG. 4, in response to receiving encapsulated packet 620 from VM1 110 (e.g., via a downlink interface), CGW1 160 performs decapsulation to remove the outer header (O1). CGW1 160 then determines that packet P1 610 is destined for X1 130 located in external network=88.0.0.0/16, which is reachable via uplink logical interface LRP1 161 according to (destination=88.0.0.0/16, interface=LRP1). See route information 502 in FIG. 6. At 456, CGW1 160 may also store state information associated with the packet flow to facilitate steering of the return traffic (i.e., ingress) from X1 130. Any suitable state information may be stored, such as five-tuple information (source IP address=IP-VM1, destination IP address=IP-X1, source port number, destination port number, protocol), packet sequence number, etc.

At 460 in FIG. 4, CGW1 160 identifies service path 104 based on matching service insertion rule 504 that is applicable to uplink logical interface LRP1 161. As shown at 630 in FIG. 6, block 460 may also involve CGW1 160 matching any suitable packet characteristics such as (source=IP-VM1, destination=IP-X1) to corresponding service insertion rule 504 specifying (source=11.0.0.0/16, destination=88.0.0.0/16, appliedTo=LRP1, action=redirect to IP-SVM).

At 465 in FIG. 4, CGW1 160 generates second encapsulated packet 640 that includes inner packet (P1) and second outer header (O2). Outer header (O2) may be a tunnel header addressed from source tunnel IP address=IP-CGW to destination tunnel IP address=IP-Y, which is a routable IP address of SVM1 150. Using IPSec for example, encapsulated packet 640 may be padded with encryption-related data (not shown for simplicity), such as ESP trailer data and ESP authentication data before being sent over tunnel 140.

At 470 in FIG. 4, CGW1 160 sends second encapsulated packet 640 over tunnel 140 via tunnel interface VTI1 141. As previously discussed, encapsulated packet 640 is forwarded to SVM1 150 assigned with the active role based on route information (destination=IP-SVM, interface=VTI1) shown at 501 in FIG. 6. In the event of a failure at SVM1 150, SVM2 152 will advertise IP-SVM to CGW1 160 such that encapsulated packet 640, or any subsequent packet, is forwarded to SVM2 152 instead via a different tunnel interface (not shown in FIG. 6 for simplicity).

(b) Processing by Service Path

At 475 and 480 in FIG. 4, in response to receiving second encapsulated packet 640 via tunnel 140, SVM1 150 performs decapsulation to remove outer header (O2) and any necessary packet processing on inner packet (P1). Using a firewall service as an example, SVM1 150 may determine whether to allow or drop the inner packet (P1) based on a firewall rule. In another example, SVM1 150 may perform NAT for packets to and from external network 105, such as by translating a private IP address (e.g., source IP-VM1) associated with VM1 110 to a public IP address in inner packet (P1).

At 485 in FIG. 4, after performing packet processing (e.g., inner packet is not dropped), SVM1 150 generates third encapsulated packet 650 that includes processed inner packet (P1*) and a third outer header (O3) that is addressed from IP-Y to IP-CGW. At 490, SVM1 150 forwards third encapsulated packet 650 to CGW1 160 via tunnel interface VTI2 142 according to default route information 503 in FIG. 6.

According to examples of the present disclosure, tunnel 140 may be established to secure all communication between CGW1 160 and SVM1 150. Using IPSec for example, encapsulated packets 640-650 in FIG. 6 may be authenticated (two ways) and encrypted. Some users may prefer secure communication between CGW1 160 and SVM1 150 because there might be operational needs for not trusting the underlying cloud infrastructure in public cloud environment 100. In practice, the trust between CGW1 160 and SVM1 150 may be established using any suitable credentials (e.g., passwords, certificates, etc.). In this case, it is not necessary to trust the underlying infrastructure (owned by a cloud provider) to provide confidentiality or any security property because of cryptographically-secure IPSec tunnel 140. The challenges of providing service insertion in public cloud environment 100 should be contrasted against a private cloud environment, where the underlying infrastructure may be privately owner and therefore trusted implicitly in general.

(c) Packet Forwarding to Destination

At 495 and 496 in FIG. 4, in response to receiving third encapsulated packet 650 from SVM1 150 via tunnel 140, CGW1 160 sends processed inner packet (P1*) 660 via LRP1 161 towards X1 130 in external network 105. Alternatively (not shown in FIG. 6), if CGW1 160 communicates with external network 105 using a tunneling protocol, processed inner packet 660 may be encapsulated with an outer header before being sent towards destination X1 130. CGW1 160 may perform route lookup to retrieve route information 502 specifying (destination=88.0.0.0/16, interface=LRP1) to forward processed inner packet 660 towards external network 105 via LRP1 161.

At 497, in response to receiving processed inner packet 660, X1 130 may receive and forward processed inner packet 660 to destination application (APP) 132, thereby completing the end-to-end packet forwarding process with service insertion operations by CGW1 160 and SVM1 150. In the example in FIG. 5, service insertion rules 504-505 are "stateless," in that separate rules are configured for egress traffic (i.e., 504) and ingress traffic (i.e., 505). The state information stored at block 456 may be used to ensure that the same service insertion rule 504 is not processed by CGW1 160 twice (i.e., once when a packet is received from VM1 110 at block 455, and another when the packet is received from SVM1 150 after processing at block 495).

Service Insertion for Ingress Traffic

Example process 400 in FIG. 4 may be performed for the reverse or return traffic from X1 130 to VM1 110. Using a policy-based routing approach, ingress traffic may be redirected to SVM1 150 according to service insertion rule 505 configured at block 435. In the following, an example will be explained using FIG. 7, which is a schematic diagram illustrating second example 700 of tunnel-based service insertion for ingress traffic in public cloud environment 100 according to the example in FIG. 4. The example in FIG. 7 may be implemented for any suitable pair of source and destination endpoints.

(a) Steering Towards Service Path

Figure 7:
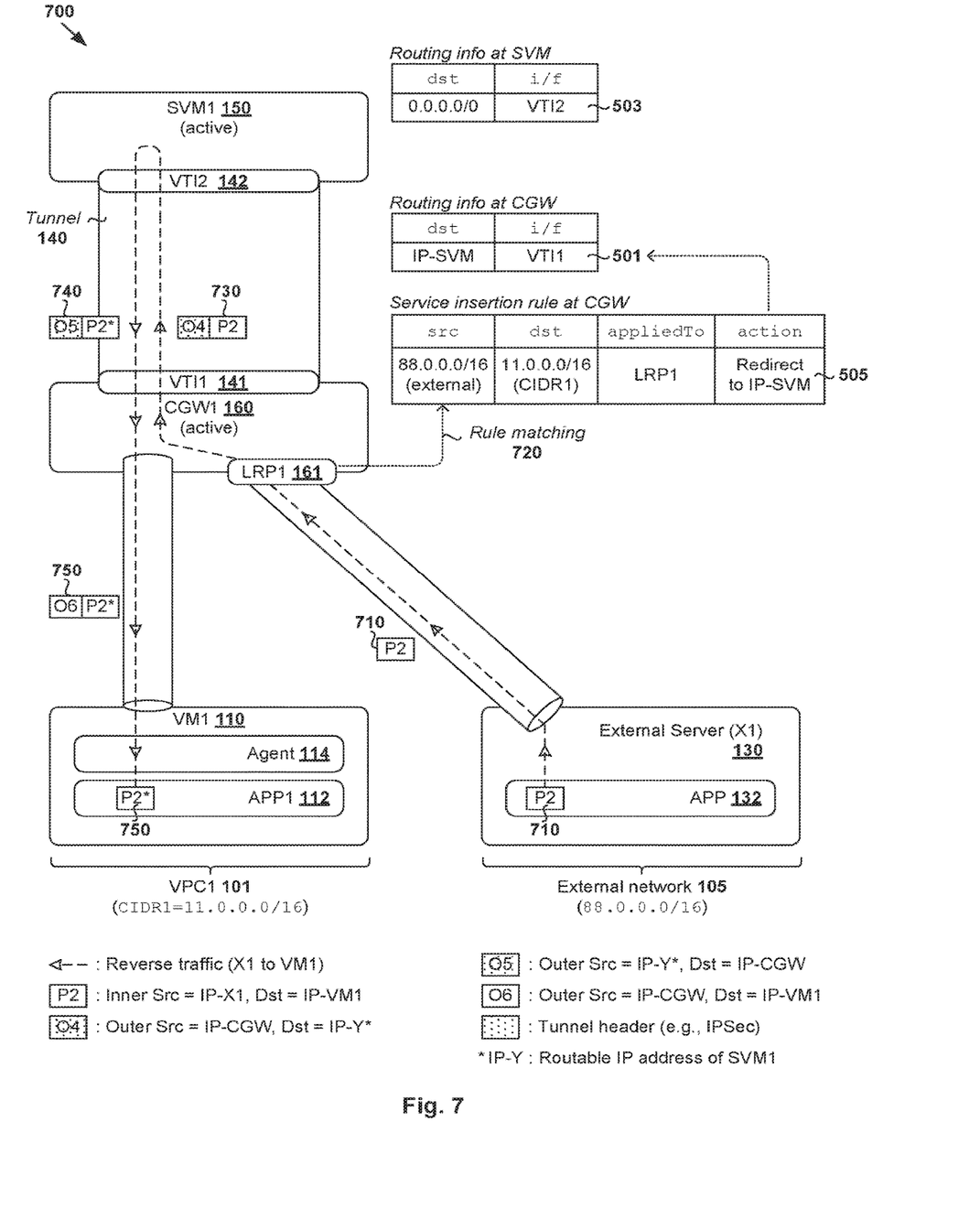
FIG. 7 is a schematic diagram illustrating a second example of tunnel-based service insertion for ingress north-south traffic in a public cloud environment according to the example in FIG. 4.

In the example in FIG. 7, application APP 132 running on external server X1 130 (i.e., source endpoint) sends ingress packet 710 (labelled "P2") to APP1 112 running on VM1 110 (i.e., destination endpoint). In response to receiving ingress packet 710 via LRP1 161, CGW1 160 proceeds to identify service path 104 based on service insertion rule 505. This may involve matching characteristics such as (source=IP-X1, destination=IP-VM1, ingress interface=LRP1 161) associated with ingress packet 710 with corresponding (source=88.0.0.0/16, destination=11.0.0.0/16, appliedTo=LRP1) in service insertion rule 505. See corresponding 720 in FIG. 7.

Applying service insertion rule 505, CGW1 160 performs action=redirect to SVM1 150. This involves CGW1 160 generating encapsulated packet 730 by encapsulating inner packet (P2) 710 with tunnel header (O4) that is addressed from source tunnel IP address=IP-CGW to destination tunnel IP address=IP-Y (i.e., routable IP address associated with virtual service endpoint IP address=IP-SVM). Based on a route lookup that obtains route information 501 specifying (destination=IP-SVM, interface=VTI1), CGW1 160 forwards encapsulated packet 730 to SVM1 150 over tunnel 140 via interface VTI1 141.

(b) Packet Processing by Service Path

In response to receiving encapsulated packet 730 via tunnel interface VTI2 142, SVM1 150 may perform packet processing according to blocks 475-490. In particular, after removing outer header (O2), SVM1 150 may perform any necessary packet processing on inner packet (P2). Using a firewall service as an example again, SVM1 150 may determine whether to allow or drop the inner packet (P2) based on a firewall rule. If not dropped, SVM1 150 generates processed packet 740, such as an encapsulated packet that includes inner packet (P2) and an outer header (O5) that addressed from IP-Y to IP-CGW.

In practice, SVM1 150 may be configured to perform any suitable packet processing. Using a firewall service as an example, SVM1 150 may determine whether to allow or drop inner packet (P2) based on a firewall rule. In another example, SVM1 150 may perform NAT for packets to and from external network 105, such as by translating a public IP address in inner packet (P2) to a private IP address (e.g., IP-VM1) associated with VM1 110. At 490, SVM1 150 forwards encapsulated packet 740 that includes a processed inner packet (P2*) to CGW1 160 via tunnel interface VTI2 142 according to default route information 503 in FIG. 7.

(c) Packet Forwarding to Destination

In response to receiving encapsulated packet 740, CGW1 160 performs decapsulation to remove outer header (O5). Processed inner packet (P2*) is then encapsulated with outer header (O6) that is addressed from IP-CGW to IP-VM1. At destination VM1 110, in response to receiving encapsulated packet 750, agent 114 may remove outer header (O6) before forwarding the processed inner packet (P2*) to application (APP1) 112. Similar to the example in FIG. 6, state information may be stored after receiving ingress packet (P2) 710 to ensure that the same service insertion rule 505 is not processed by CGW1 160 twice (i.e., once when ingress packet 710 is received from X1 130, and another when encapsulated packet 740 is received from SVM1 150 after packet processing). Various details explained using FIG. 4 and FIG. 5 are applicable to the return traffic and will not be repeated here for brevity.

Hub-Spoke Topology for Service Insertion

According to examples of the present disclosure, service insertion may be implemented in a more flexible and scalable manner that supports various deployment modes and/or environments. Some examples will be discussed using FIG. 8, which is a schematic diagram illustrating example hub-spoke topology 800 for tunnel-based service insertion in public cloud environment 100.

Figure 8:
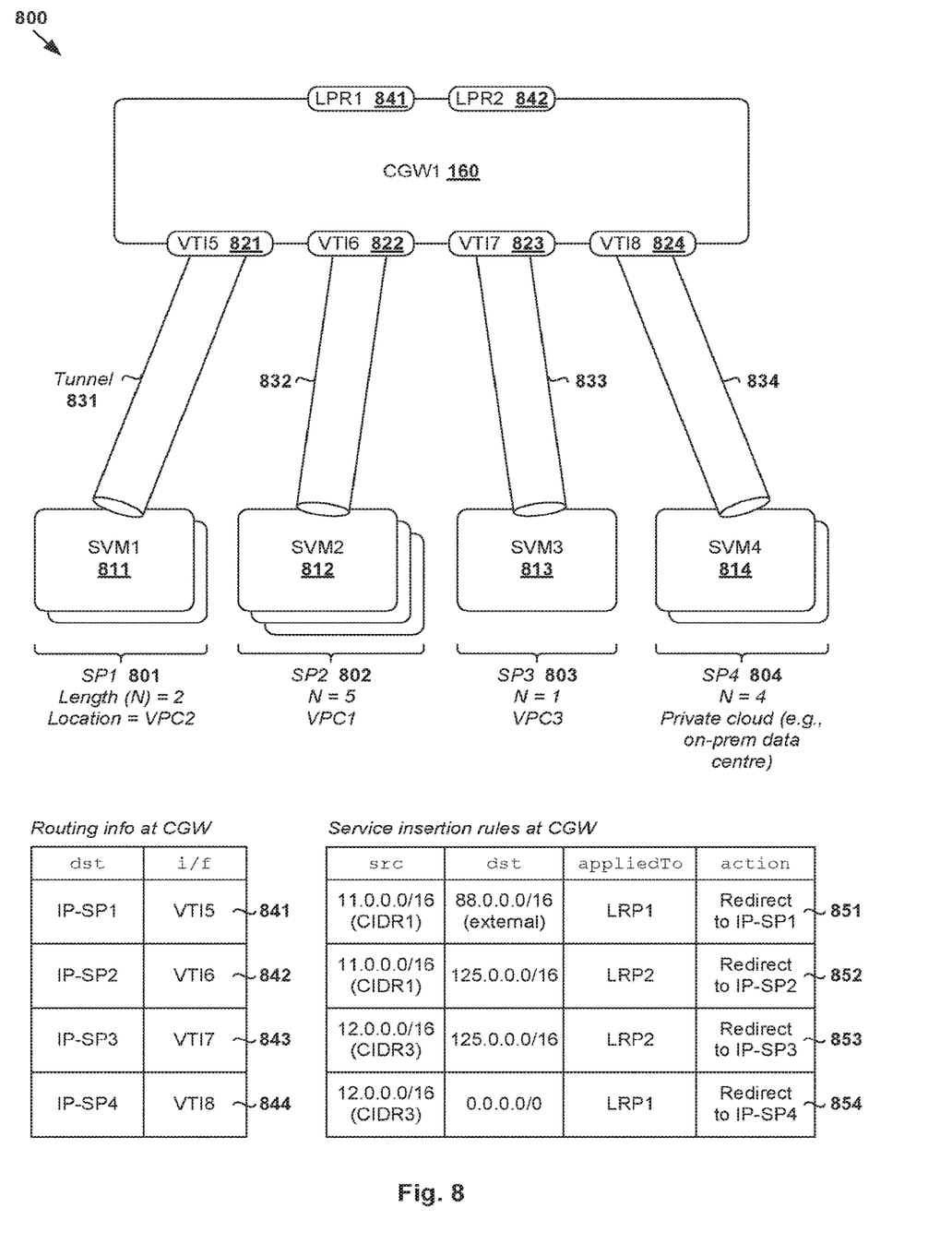
FIG. 8 is a schematic diagram illustrating an example hub-spoke topology for tunnel-based service insertion in a public cloud environment.

In the example in FIG. 8, CGW1 160 is configured to steer packets towards multiple service paths 801-804 that are configured to perform packet processing according. First service path (SP1) 801 is a chain of N=2 SVMs (including SVM1 811) that communicates with CGW1 160 over first tunnel 831. Second service path (SP2) 802 is a chain of N=5 SVMs (including SVM2 812) that communicates with CGW1 160 over second tunnel 832. Third service path (SP3) 803 includes SVM3 813 (i.e., N=1) and communicates with CGW1 160 over third tunnel 833. Fourth service path (SP4) 804 is a chain of N=4 SVMs (including SVM4 814) that communicates with CGW1 160 over fourth tunnel 834. Tunnels 831-834 may be established with different virtual tunnel endpoints 821-824 of CGW1 160.

Using hub-spoke topology 800, any suitable deployment environment may be used for each service path. For example, service paths 801-803 may be deployed in public cloud environment 100, such as VPC2 102 for SP1 801, VPC1 101 for SP2 802 (same as CGW1 160), VPC3 103 for SP3 803. In contrast, SP4 804 may be deployed in a private cloud environment, such as an on-premise data center, etc. Similar to the examples in FIG. 4 to FIG. 7, CGW1 160 may store route information (see 841-844) to reach respective service paths 801-804 based on route advertisements received over respective tunnels 831-834. Similarly, service insertion rules 851-854 that are each applicable to an uplink logical interface (LRP1 841 or LRP2 842) may be configured to facilitate service insertion using respective service paths 801-804.

Container Implementation

Although explained using VMs 110-120, 230-231, it should be understood that public cloud environment 100 may include other virtual workloads, such as containers, etc. As used herein, the term "container" or "container instance" is used generally to describe an application that is encapsulated with all its dependencies (e.g., binaries, libraries, etc.). In the examples in FIG. 1 to FIG. 8, container technologies may be used to run various containers inside respective VMs, such as 110-120, 230-231. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8. For example, the instructions or program code, when executed by the processor of the computer system, may cause the processor to implement a "network device" to perform service insertion according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for performing a set of two or more services on packets, the method comprising:
   at a cloud gateway (CGW) operating in a first network of a public cloud,
   receiving, from a second network, a packet that is addressed to reach an external server in a third network;
   performing a service insertion operation to identify a service path comprising two or more service machines for performing the set of two or more services on the packet;
   based on the identified service path, forwarding the packet to the set of two or more service machines to perform the set of two or more services on the packet;
   receiving the packet after the set of two or more services have been performed on the packet; and
   forwarding the packet to the external server operating in the third network.

2. The method of claim 1, wherein receiving the packet from the second network comprises receiving the packet from a machine operating in the second network.

3. The method of claim 2, wherein the machine operates in a first virtual private cloud (VPC) that is defined in the same public cloud as the CGW, and the second network is the network that is defined for the first VPC, while the first network is a network that is defined in a second VPC in which the CGW operates.

4. The method of claim 3, wherein the second VPC is defined to connect the second network to the third network.

5. The method of claim 3, wherein the set of service machines operates in the first VPC.

6. The method of claim 3, wherein the set of service machines operates in the second VPC.

7. The method of claim 3, wherein the set of service machines is deployed in a third VPC, and a fourth network is the network that is defined for the third VPC.

8. The method of claim 1, wherein the set of service machines is deployed in a private cloud.

9. The method of claim 1, wherein the second network is a logical network.

10. The method of claim 1, wherein the packet comprises a payload and a first header, the method further comprising:
    at each service machine in the set of service machines,
    receiving the packet comprising the payload and a second header addressing the service machine;
    removing the second header from the packet;
    performing the at least one service operation on the payload to obtain a processed payload; and
    attaching a third header to the processed payload.

11. The method of claim 10, wherein:
    the second header addressing a first service machine in the set of service machines was attached by the CGW, and
    forwarding the packet comprises removing a last header attached by a last service machine in the set of service machines and forwarding the processed payload to the external server through an uplink logical interface.

12. The method of claim 11, wherein the CGW attaches a fourth header to the processed payload before forwarding the packet to the external server.

13. The method of claim 10, wherein the third header specifies a destination address of the CGW, the method further comprising forwarding, from the CGW, the packet to another service machine to perform another service operation in the service path.

14. The method of claim 1, wherein the CGW is a first CGW, and the first CGW and a second CGW are configured as a high availability (HA) pair.

15. The method of claim 1, wherein the service path is a first service path, and the first service path and a second service path are configured as a high availability (HA) pair.

16. The method of claim 1, wherein receiving from the second network, performing the service insertion operation, forwarding the packet to the set of service machines, receiving the packet after the set of services have been performed, and forwarding the packet to the external server are performed on an uplink logical interface of the GCW.

17. A non-transitory machine readable medium storing a program for execution by at least one processing unit for performing a set of two or more services on packets, the program comprising sets of instructions for:
    at a cloud gateway (CGW) operating in a first network of a public cloud,
    receiving, from a second network, a packet that is addressed to reach an external server in a third network;
    performing a service insertion operation to identify a service path comprising two or more service machines for performing the set of two or more services on the packet;
    based on the identified service path, forwarding the packet to the set of two or more service machines to perform the set of two or more services on the packet;
    receiving the packet after the set of two or more services have been performed on the packet; and
    forwarding the packet to the external server operating in the third network.

18. The non-transitory machine readable medium of claim 17, wherein the set of instructions for receiving the packet from the second network comprises a set of instructions for receiving the packet from a machine operating in the second network.

19. The non-transitory machine readable medium of claim 18, wherein the machine operates in a first virtual private cloud (VPC) that is defined in the same public cloud as the CGW, and the second network is the network that is defined for the first VPC, while the first network is a network that is defined in a second VPC in which the CGW operates.

20. The non-transitory machine readable medium of claim 19, wherein the second VPC is defined to connect the second network to the third network.

* * * * *